Jan. 9, 1968     H. BENZ     3,362,628
TURBINE-TYPE MACHINE
Filed Feb. 5, 1965
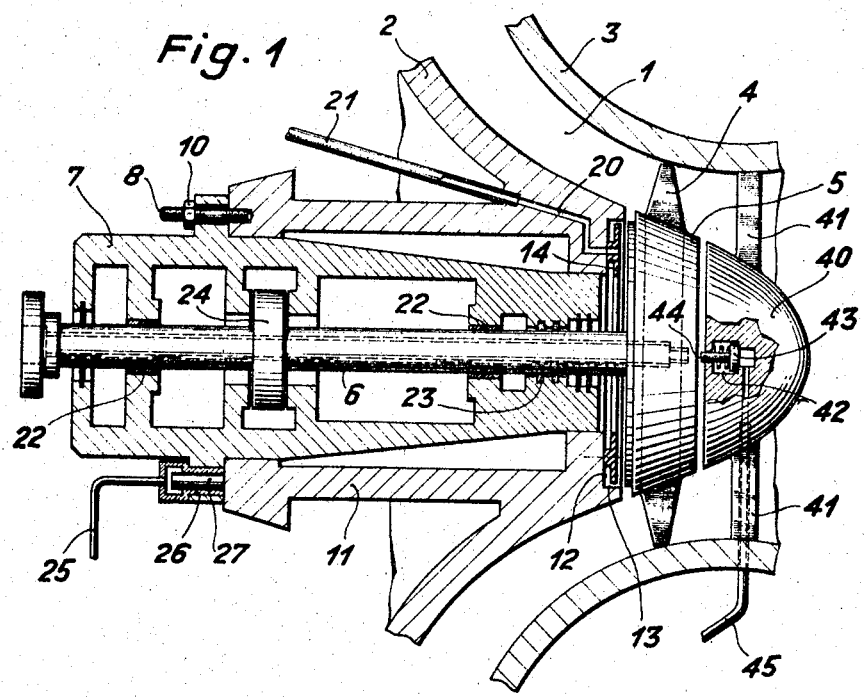
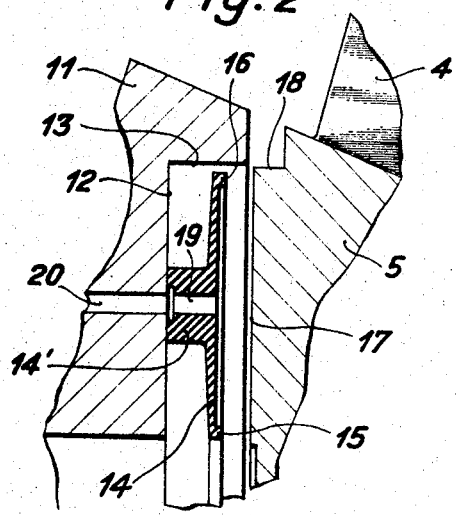
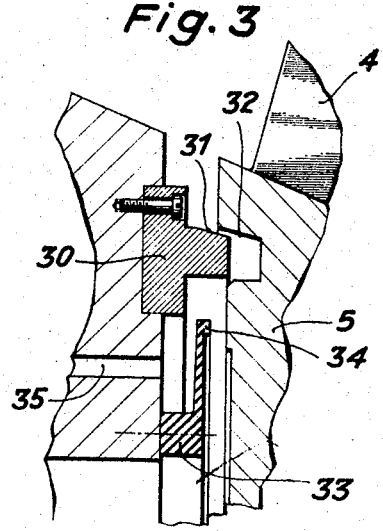
Inventor:
Hans Benz
BY
Pennie Edmonds
Morton, Taylor and Adams
ATTORNEYS

United States Patent Office 3,362,628
Patented Jan. 9, 1968

3,362,628
TURBINE-TYPE MACHINE
Hans Benz, Winterthur, Switzerland, assignor to Sulzer Brothers Limited, Winterthur, Switzerland, a Swiss company
Filed Feb. 5, 1965, Ser. No. 430,672
Claims priority, application Switzerland, Feb. 12, 1964, 1,700/64
4 Claims. (Cl. 230—120)

The present invention pertains to a turbine-type machine such as a blower in which the rotor bearing means are axially movable in a housing which includes a packing against which the rotor may be sealed when it is not rotating.

In closed cycle flow systems, for example those of nuclear reactors, it is desirable to provide for disassembly and removal of the shaft seal and bearings of a blower without interrupting flow in the cycle. Circulation must be maintained, and consequently there are provided a number of blowers in parallel of which there is stopped at one time only the one from which parts are to be removed for repair or replacement.

Precisely in these systems the construction is such that the bearings and shaft seals are of difficult access. The invention has for an object the provision of an arrangement in which the above-indicated demands are fulfilled.

The invention will now be described in terms of a number of non-limitative exemplary embodiments with reference to the accompanying drawings, in which FIGURE 1 is a view in axial section through a circulating blower of a nuclear reactor according to the invention;

FIGURE 2 is a view of a portion of FIG. 1 at an enlarged scale; and

FIGURE 3 is a view similar to that of FIGURE 2 but illustrating a modified form of construction according to the invention.

In FIGURE 1 the reference character 1 represents, fragmentarily, a channel in the coolant flow cycle of a nuclear reactor. The channel is defined by walls 2 and 3. Disposed therein is the rotor 5 of an axial blower. The rotor has blades 4 and is supported on a shaft 6 borne in a bearing housing 7. The rotor 5 is readily detached from the shaft. The bearing housing 7 is fastened into a cylindrical outer housing 11 by means of stubs 8 having nuts 10, the housing 11 being fixed with respect to the walls 2 and 3. On the side thereof presented to the rotor, the housing 11 includes a recess or counter-bore 12 having a cylindrical surface 13. An annular plate 14 of elastic material, illustrated in greater detail in FIGURE 2, is disposed in the counter-bore 12. The plate 14 bears at a ridge 14' thereof against the outer housing 11 and further includes on the side thereof opposite ridge 14' two ridges 15 and 16 at its radially inner and outer limits. These ridges 15 and 16 constitute a packing and effect a seal with a plane surface 17 of the rotor 5 when the rotor is shifted axially after being stopped. The rotor 5 also includes a cylindrical surface 18 of a diameter slightly smaller than that of the surface 13, the difference being provided for centering purposes. A bore 19 is provided through the plate 14, at the ridge 14' thereof, and the bore 19 mates with a bore 20 in the housing 11. A tube 21 connects to the bore 20. Tube 21 leads to a controllable source of gas pressure (not shown) provided by a sealing gas, which pressure can be made either negative or positive, i.e. either a suction or an excess pressure.

Radial bearings 22, a thrust bearing 24 and a shaft seal 23 are provided in the bearing housing 7. The housing 7 may have affixed thereto a cylinder 26 containing a piston 27 and connected through a conduit 25 to a source of hydraulic pressure.

In front of the rotor 5 is disposed a streamlined body 40 which is supported from the wall 3 of channel 1 by means of struts 41. The streamlined body 40 contains a cylinder 42 with piston 43 therein, spring-loaded away from the rotor as shown in the drawing. The piston 43 carries an actuating rod 44 which bears against the rotor 5 when actuated by introduction of fluid under pressure into cylinder 42. Operation of the piston 43 is effected by supply of a hydraulic fluid under pressure into the cylinder 42 via a line 45.

During operation of the blower, the rotor with its blades 4 drives the gaseous reactor coolant medium through the channel 1 and thereby causes its circulation through the reactor and heat exchanger not shown. If for any reason it becomes necessary to remove the housing 7, as for example due to malfunctioning of the shaft seal 23 or damage to one of the bearings, then after the rotor has been brought to a stop, the nuts 10 are loosened. Due to the positive pressure existing in channel 1, the rotor 5 and bearing housing 7 will be moved to the left in FIGURE 1 until the rotor 5 enters with its cylindrical portion 18 the counter-bore 12 in housing 11 and until the rotor surface 17 brings up against the ridges 15 and 16 of the elastic plate 14. In the process the rotor is maintained centered by the surfaces 13 and 18. Vacuum can then be applied to the conduit 21 so as to remove any cycle gas from channel 1 which may have gotten past the outer sealing ridge 16. Thereupon the shaft 6 can be freed from the rotor 5 and drawn to the left, together with the bearing housing 7 out of the housing 11, so that any necessary repairs to the bearings or packings can be carried out. In the process, the rotor 5 closes the opening in the housing 11 and prevents passage to the exterior of the gas in the cycle including the channel 1.

If for any reason the excess pressure in channel 1 should not suffice to hold the rotor against the plate 14 to preserve a seal of the channel 1, the pin 44 can be driven by piston 43 against the rotor 5 to press the latter against plate 14 by supply to line 45 of a hydraulic medium under pressure, advantageously the same as that flowing in the channel 1. In the event of a withdrawal of the bearing housing 7 for a long period, the rotor can be pressed against the packing by mechanical means such as suitable bolts.

In the event that the rotor 5 is vertically positioned at the upper end of its shaft, the operation will be simplified to the extent that the desired axial shift of the bearing housing 7 will be fostered by its own weight. In such a case, it will be unnecessary to provide any particular arrangement for holding the rotor 5 in contact with the packing 14. It is moreover also possible with a horizontal arrangement as shown in FIGURE 1 to provide for fixing of the rotor in position by means other than the pin 44. Thus for example, to name only one possibility, permanent magnets might be arranged in the housing 11 to draw the rotor 5 to the left into sealing position.

The seal between the rotor and housing achieved by axial shift of the rotor may be effected not only in the case of removal of the bearing housing. It is possible in this way to remove the load on the axial seals 23 in the event of a temporary stopping of the blower.

If the excess pressure prevailing in the channel 1 is not sufficient to cause an axial shift of the rotor 5 and housing 7 for removal of the latter, a hydraulic medium such as oil may be supplied under pressure through the conduit 25 to the cylinder 26. In this way, the piston 27 will be pressed against the outer housing 11 and the bearing housing 7 will be withdrawn therefrom to the left in FIGURE 1.

FIGURE 3 shows a modified construction of the double seal of which one embodiment is shown in FIGURE 2. According to FIGURE 3, the part of the seal at the larger diameter thereof is made in the form of a ring 30 having an outside conical surface 31. When the rotor is in its left-ward, sealing position, the conical surface 31 cooperates with an inside conical surface 32 provided on the rotor. The inner part of the seal is formed by an annular plate 33, also preferably of elastic material, having a ridge 34 corresponding to one of the ridges 15 and 16 of FIGURE 2. The conduit for supply of vacuum is identified at 35 in FIGURE 3. The operation of the seal of FIGURE 3 is in principle the same as that of FIGURE 2. By means of the conical surfaces 31 and 32, however, there is achieved not only a sealing but a centering of the rotor.

While the invention has been described herein in terms of a number of preferred embodiments, the invention itself is not limited thereto but rather comprehends various modifications which may be made within the spirit and scope of the appended claims. In particular, while the apparatus of the invention has herein been designated a turbine, the invention includes machines of the type commonly referred to as turbo blowers in which mechanical energy is used to drive a rotor to pump a fluid.

I claim:

1. A turbomachine comprising a rotor, a stationary housing, bearings for support of the rotor, said bearings being axially movable in the housing between operating and rest positions for the rotor, and a packing in the housing against which the rotor bears upon axial shift of the rotor to rest position therefor, the rotor and housing having each a surface concentric in the axis of rotation of the rotor for support of the rotor upon axial shift of the rotor to rest position therefor.

2. A turbomachine comprising a rotor, a stationary housing, bearings for support of the rotor, said bearings being axially movable in the housing between operating and rest positions for the rotor, an outer ring on the housing having an outside conical surface, an inside conical surface on the rotor mating with said outside conical surface upon axial shift of the rotor to rest position therefor, and an inside ring on the housing against which the rotor bears upon axial shift of the rotor to rest position therefor.

3. A turbomachine according to claim 1 wherein said surfaces are cylindrical.

4. A turbomachine according to claim 1 wherein said surfaces are conical.

References Cited

UNITED STATES PATENTS

| | | | |
|---|---|---|---|
| 1,263,561 | 4/1918 | Keating et al. | 103—111 |
| 1,667,992 | 5/1928 | Sherwood et al. | 103—111 |
| 1,736,426 | 11/1929 | Bond | 103—111 |
| 3,088,416 | 5/1963 | Danis | 103—111 |
| 3,130,679 | 4/1964 | Sence | 103—111 |

FOREIGN PATENTS

| | | |
|---|---|---|
| 1,237,156 | 6/1960 | France. |
| 375,937 | 7/1932 | Great Britain. |

HENRY F. RADUAZO, *Primary Examiner.*